US 6,691,443 B1

(12) United States Patent
Slayden

(10) Patent No.: US 6,691,443 B1
(45) Date of Patent: Feb. 17, 2004

(54) ALPHA-NUMERIC/GRAPHIC DISPLAY BOARD ILLUMINATOR

(75) Inventor: James C. Slayden, Talala, OK (US)

(73) Assignee: Lektron, Inc., Tulsa, OK (US)

( * ) Notice: Subject to any disclaimer, the term of this patent is extended or adjusted under 35 U.S.C. 154(b) by 0 days.

(21) Appl. No.: 10/247,984

(22) Filed: Sep. 20, 2002

(51) Int. Cl.[7] .............................................. G09F 13/18
(52) U.S. Cl. ............................ 40/546; 40/568; 40/618; 362/31
(58) Field of Search ......................... 40/546, 568, 575, 40/576, 618; 362/31, 812

(56) References Cited

U.S. PATENT DOCUMENTS

| | | | | | |
|---|---|---|---|---|---|
| 1,188,695 | A | * | 6/1916 | Star ............................. | 40/618 |
| 3,497,686 | A | * | 2/1970 | Young ........................... | 40/546 |
| 3,866,343 | A | * | 2/1975 | Frost et al. ................... | 40/585 |
| 3,905,139 | A | * | 9/1975 | Cooper ......................... | 40/545 |
| 4,373,282 | A | * | 2/1983 | Wragg .......................... | 40/546 |
| 4,991,334 | A | * | 2/1991 | Amundsen .................... | 40/568 |
| 5,136,480 | A | * | 8/1992 | Pristash et al. ............... | 362/31 |
| 5,640,792 | A | * | 6/1997 | Smith et al. .................. | 40/546 |
| 5,786,665 | A | * | 7/1998 | Ohtsuki et al. .............. | 313/512 |
| 5,842,297 | A | * | 12/1998 | Tung ............................ | 40/546 |
| 5,901,486 | A | * | 5/1999 | Sharon et al. ................. | 40/618 |
| 6,286,970 | B1 | * | 9/2001 | Egawa et al. ................. | 362/31 |
| 6,363,645 | B1 | * | 4/2002 | Hunter ......................... | 40/618 |
| 6,494,588 | B1 | * | 12/2002 | Okada ......................... | 362/31 |
| 6,530,164 | B2 | * | 3/2003 | Gai .............................. | 40/546 |

* cited by examiner

Primary Examiner—Gary Hoge
(74) Attorney, Agent, or Firm—Frank J. Catalano

(57) ABSTRACT

An illuminator for an alpha-numeric/graphic information board is adapted to be disposed in front of the information. An array of light sources directly illuminates an edge of the lens and a plurality of grooves arranged in a front face of the lens disperses the light received from the array onto the information. This reduces the possibility of reflection of light from the illuminator toward the observer and does not significantly increase the overall thickness of the board. A transparent cover disposed against te front face of the lens protects the lens from dirt, debris, scratches, nicks and other damage and is easily cleaned and inexpensive to replace. Masking strips disposed on the rear face of the cover coincide with the grooves to block light from being dispersed away from the information and to emphasize or frame the information being illuminated to the observer.

28 Claims, 3 Drawing Sheets

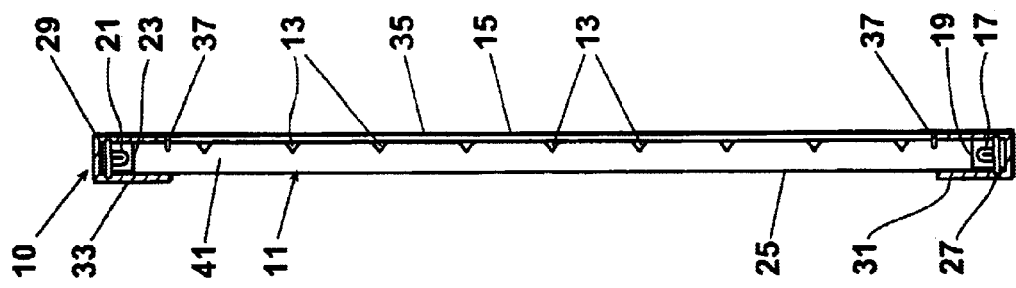
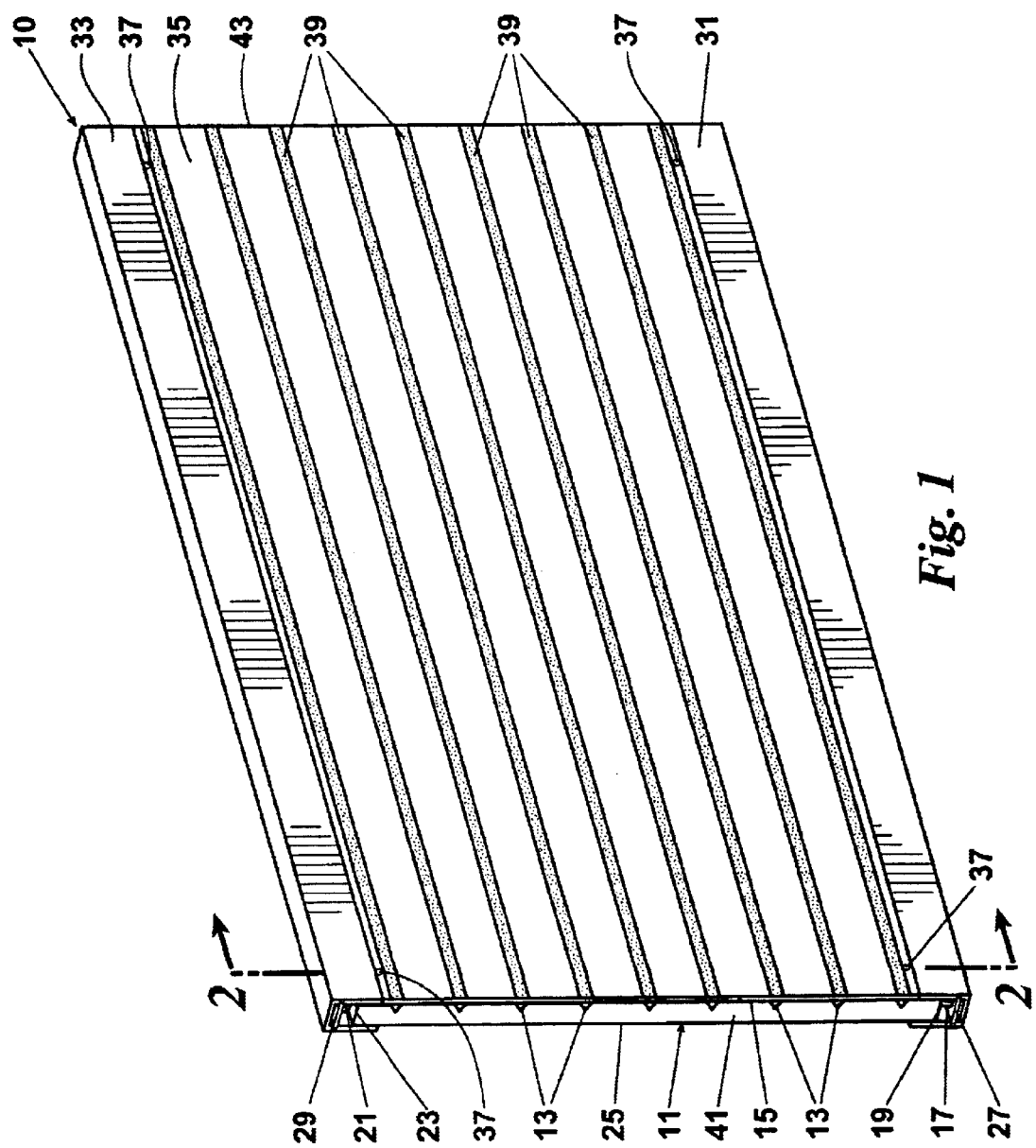

ALPHA-NUMERIC/GRAPHIC DISPLAY BOARD ILLUMINATOR

BACKGROUND OF THE INVENTION

This invention relates generally to illumination devices and more particularly concerns an illuminator for use with boards displaying alpha-numeric/graphic information.

Alpha-numeric and graphic display boards such as the wall mounted menus commonly seen in fast food restaurants are presently illuminated externally by sources directing light toward the front of the board onto the information or by internal sources directing light from behind the board through the information.

Externally illuminated boards direct light toward the front of the board and reflect the light toward the observer. The reflecting surface may be a cover shielding the information or the information itself if no cover is present. Internally illuminated boards direct light through the information toward the observer or generally through both the information and a cover. The resulting reflection or refraction of light reduces the efficiency of the fixture and can have an irritating and harsh impact on the eyes of the observer. Also, if the light is angled with respect to the cover, dirt and imperfections on and defect in the cover are illuminated and enhanced to the eye of the observer.

It is, therefore, an object of this invention to provide a display board illuminator which is internally illuminated. Another object of this invention is to provide a display board illuminator which is illuminated by an internal light source forward of the information being illuminated. A further object of this invention is to provide a display board illuminator which directs light toward the information and away from the observer. Yet another object of this invention is to provide a display board illuminator which is structurally thin. It is also an object of this invention to provide a display board illuminator which reduces the possibility of light being reflected toward the observer. Still another object of this invention is to provide a display board illuminator which reduces the possibility of light being directed toward the observer. An additional object of this invention is to provide a display board illuminator which reduces the possibility of light washing the face of the board. Another object of this invention is to provide a display board illuminator which reduces the illumination and enhancement of dirt imperfections and defects on and in the cover. A further object of this invention is to provide a display board illuminator which has long life. Yet another object of this invention is to provide a display board illuminator which is easily maintained and cleaned. It is also an object of this invention to provide a display board illuminator which is efficient in terms of power consumption and dispersion of light. Still another object of this invention is to provide a display board illuminator which enhances the visual clarity of the illuminated information.

SUMMARY OF THE INVENTION

In accordance with the invention, an illuminator is provided for use with a board displaying alpha-numeric/graphic information on its front face. A lens is adapted to be disposed in front of the information. An array of light sources directly illuminates an edge of the lens and a plurality of grooves arranged in a front face of the lens disperses the light received from the array through the back face of the lens onto the information. Directly lighting the edge of the lens reduces the possibility of reflection of light from the illuminator toward the observer. Also, since only the edge is directly lighted, the illuminator does not significantly increase the overall thickness of the board.

In a preferred embodiment, a transparent cover is disposed against the front face of the lens. The cover protects and shields the lens from dirt, debris, scratches, nicks and other damage, is easily cleaned and can be inexpensively and quickly replaced. Also, masking strips can be disposed on the rear face of the cover so as to coincide with the grooves. The marking strips block light from being dispersed away from the information and also emphasize or frame the information being illuminated to the observer.

For boards displaying parallel lines or strips of alpha-numeric/graphic information on their front face, it is preferred that parallel grooves be positioned in the front face of the lens which can be orthogonally juxtaposed between the strips. This affords greater efficiency in the dispersion of light on the information. It is also preferred in the parallel arrangement that the lens has upper and lower edges which are parallel to the grooves and that an array of light sources illuminates one of the parallel edges or that two arrays of light sources illuminate both parallel edges. In a most preferred embodiment, the lens is rectangular and four arrays of light sources illuminate all the side edges of the lens. The preferred light sources are directional light emitting diodes.

The illuminator can be retrofitted to existing information boards or may be combined with a specially compatible board which has a front face with a plurality of spaced-apart channels for lateral slidable insertion and removal of the strips of information. Each of the channels has upper and lower flanges and a central rib along its length for engaging front and rear faces of the strips of information, respectively. The ribs push the strips forward against the flanges to firmly secure the strips in place.

BRIEF DESCRIPTION OF THE DRAWINGS

Other objects and advantages of the invention will become apparent upon reading the following detailed description and upon reference to the drawings in which:

FIG. 1 is a front perspective view of one embodiment of the illuminator of the present invention;

FIG. 2 is a cross-sectional view taken along the line 2—2 of FIG. 1;

Figure 4:
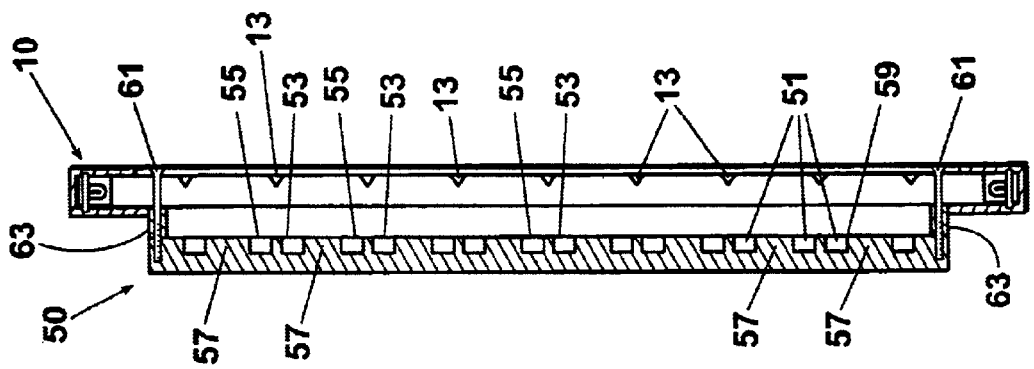
FIG. 4 is a cross-sectional view taken along the line 4—4 of FIG. 3.

While the invention will be described in connection with a preferred embodiment, it will be understood that it is not intended to limit the invention to that embodiment. On the contrary, it is intended to cover all alternatives, modifications and equivalents as may be included within the spirit and scope of the invention as defined by the appended claims.

DETAILED DESCRIPTION

Turning first to FIGS. 1 and 2, an illuminator 10 to be disposed in front of an information display board is illustrated. The illuminator consists of a transparent lens 11 with an array of grooves 13 in its front face 15. An array of light sources 17 directly illuminates a lower edge 19 of the lens 11 and another array of light sources 21 directs light at the upper edge 23 of the lens 11. The light transmitted from the sources 17 and 21 passes through the lens 11 and is redirected by the grooves 13 through the back face 25 of the lens 11. The light sources 17 and 21 are preferably light emitting diodes as shown and most preferably are directional light emitting diodes focusing their light through the edges 19 and 23 of the lens 11. As shown, the diodes 17 and 21 are mounted on circuit boards 27 and 29 which are in turn disposed in clips 31 and 33 which can be snapped onto, pinned or otherwise secured to the lens 11. A comparatively thin transparent cover sheet 35 can optionally be secured over the front face 15 of the lens 11, such as by use of screws 37. A plurality of opaque masking strips 39 can also optionally be applied to the back face of the cover sheet 35 to assure that light is not transmitted from the grooves 13 through the cover sheet 35.

In the preferred embodiment illustrated in FIGS. 1 and 2, the illuminator 10 has a rectangular transparent lens 11, the grooves 13 are parallel to each other and to the lower 19 and upper 21 edges of the lens 11 and the left and right side edges 41 and 43 of the lens 11 are orthogonal to the lower and upper edges 19 and 23. While this preferred embodiment has been found to be very efficient, the edges 19, 21, 41 and 43 need not necessarily be orthogonal, the grooves 13 need not necessarily be parallel or straight and direct illumination more than one edge of the lens 11 is not necessary, so long as the grooves 13 are in the path of light directed through an edge of the lens 11. If a cover sheet 35 and masking are desired, the masking strips 39 can be applied to the back face of the cover sheet 35 by use of paint, tape or any other opaque material which can be adhered or fixed to the cover sheet 35.

Figure 3:
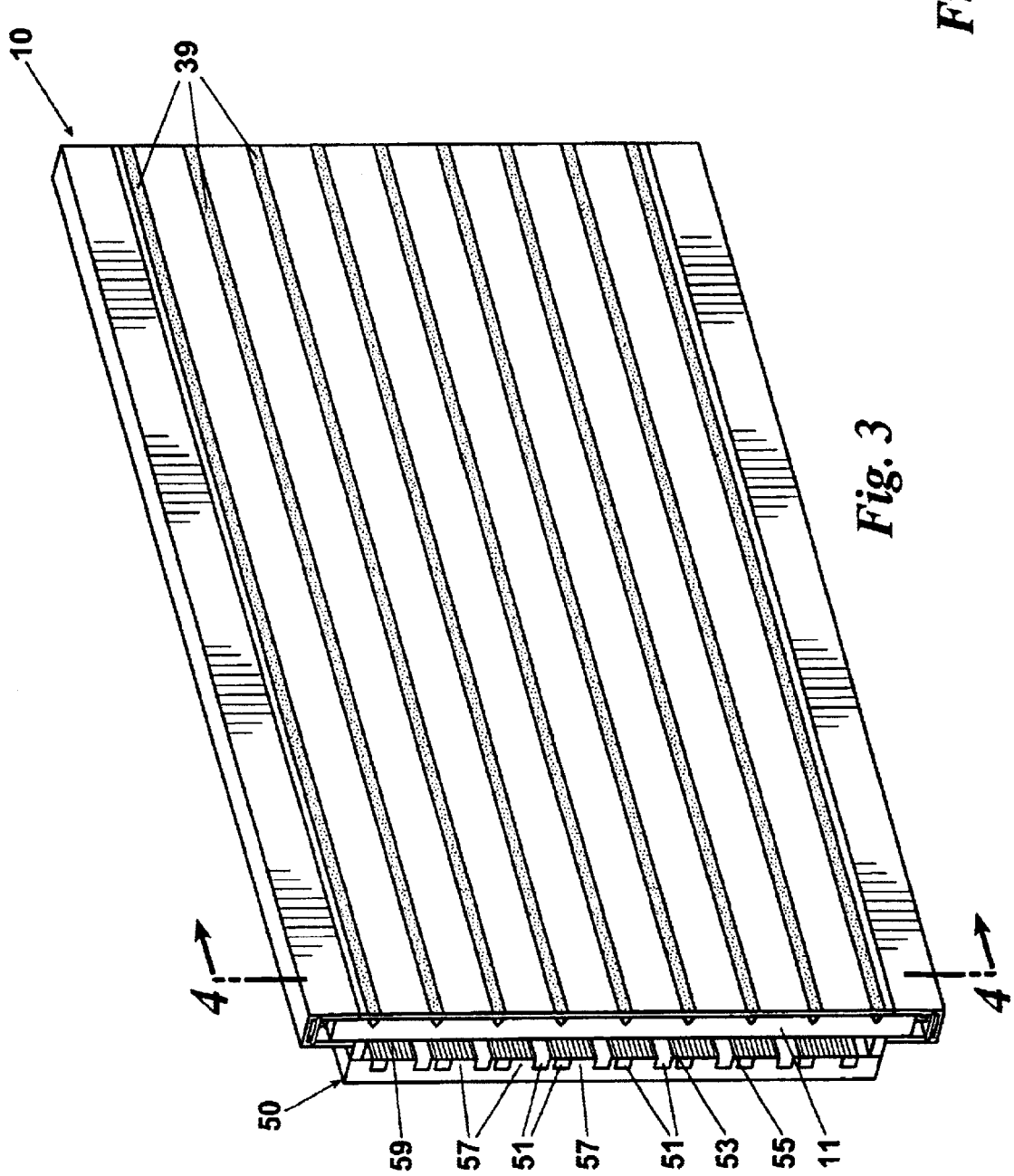
FIG. 3 is a front perspective view of the illuminator of FIG. 1 used in conjunction with a menu board.

Turning now to FIGS. 3 and 4, the illuminator 10 of FIGS. 1 and 2 is illustrated mounted on a board 50 for displaying alpha-numeric-graphic information. As shown, the board 50 has a plurality of spaced apart channels 51 in its front face with upper and lower flanges 53 and 55 extending across its width. Ribs 57 defined by the channels 51 extend between the upper and lower flanges 53 and 55. Thus, strips of material 59 can be inserted laterally into the board 50 with the ribs 57 pressing against the rear face of the strips 59 to force the front face of the strips 59 against the back faces of the upper and lower flanges 53 and 55. As best seen in FIG. 4, the lens 11 is secured to the board 50 so that the masking strips 39 on the cover sheet 35 and grooves 13 in the lens 11 orthogonally coincide with the flanges 53 and 55 so as to frame the strips 59 between pairs of grooves 13 and masking strips 39. As shown, the illuminator 10 can be secured to the board 50 by use of screws 61 with spacers 63 disposed between the illuminator 10 and the board 50. It has been found that a lens 11 of one-half inch thick glass with grooves 13 in the front face of the lens 11 being on 1.375 inch centers and spacers 63 of a length such that the distance from the nadir of the groove 13 is 0.775 inches from the front face of the information strip 59 is very efficient. The V-shaped grooves 13 shown herein have been found to work quite satisfactorily. However, the grooves 13 can have a variety of cross-sections, such as semi-circular or semi-elliptical. Some space between the front face of the information strips 59 and the rear face of the lens 11 is necessary for proper light dispersion and also to facilitate easy removal and insertion of the information strips 59 into the channels 51. However, it is desirable that this space be minimal because, as best seen in FIG. 4, if the observer's view is not perpendicular to the front face of the lens 11, the masking strips 39 may obstruct the view of the upper and lower edges of the information strips 59.

Figure 5:
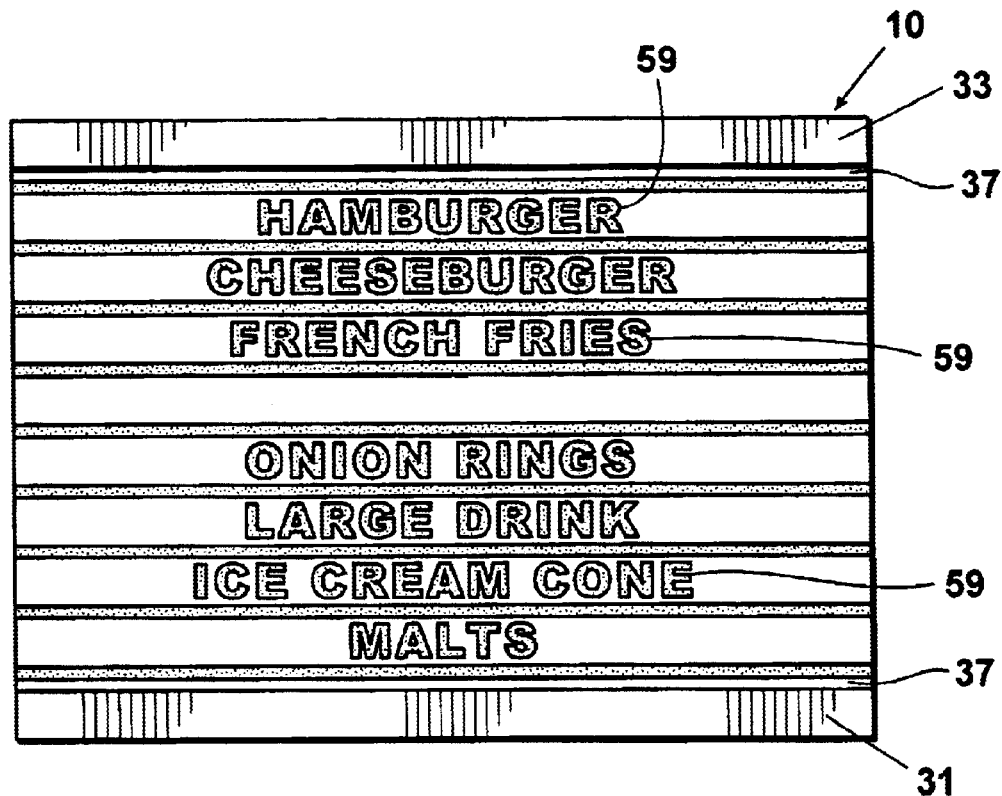
FIG. 5 is a front view of the illuminator and board of FIG. 3 with alpha-numeric and graphic information displayed thereon.
Figure 6:
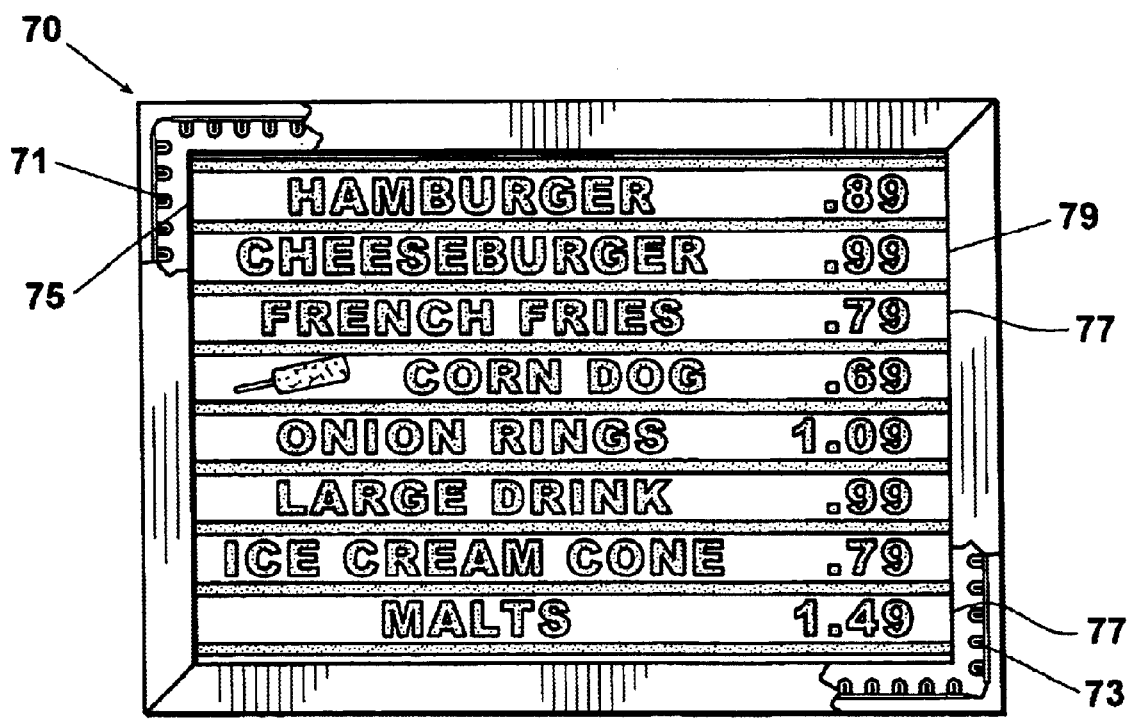
FIG. 6 is a front view of another embodiment of the illuminator of the present invention with parts broken away used in conjunction with a menu board with alpha-numeric and graphic information displayed thereon.

Turning to FIG. 5, the illuminator 10 and board 50 of FIGS. 3 and 4 is illustrated with strips of alpha information disposed in the channels. In FIG. 6, another embodiment of the illuminator 10 and board 50. Another embodiment of the illuminator 70 is illustrated in which third and fourth arrays of light sources 71 and 73 are used to illuminate the side edges 75 and 77 of the lens 79 using the principles above described in relation to the illuminator 10.

Thus, it is apparent that there has been provided, in accordance with the invention, an alpha-numeric/graphic display board illuminator that fully satisfies the objects, aims and advantages set forth above. While the invention has been described in conjunction with a specific embodiment thereof, it is evident that many alternatives, modifications and variations will be apparent to those skilled in the art and in light of the foregoing description. Accordingly, it is intended to embrace all such alternatives, modifications and variations as fall within the spirit of the appended claims.

What is claimed is:

1. For a board displaying alpha-numeric/qraphic information on a front face thereof, an illuminator comprising a lens adapted to be disposed in front of the information, an array of light sources directly illuminating an edge of said lens, a plurality of grooves arranged in a front face of said lens for dispersing light received from said array onto the information, and a plurality of masking strips disposed on a rear face of said cover, each masking strip being coincident with one of said grooves.

2. For a board displaying a plurality of parallel strips of alpha-numeric/graphic information on a front face thereof, an illuminator comprising a lens adapted to be disposed in front of the information, an array of light sources directly illuminating an edge of said lens and a plurality of parallel grooves positioned in a front face of said lens, said grooves being aligned with spaces between adjacent pairs of the parallel strips, for dispersing light received from said array onto the strips of information.

3. An illuminator according to claim 2, said lens having upper and lower edges parallel to said grooves.

4. An illuminator according to claim 3, said array of light sources illuminating one of said parallel edges.

5. An illuminator according to claims 4 further comprising a second array of light sources illuminating another of said parallel edges.

6. An illuminator according to claim 5, said lens being rectangular.

7. An illuminator according to claim 6 further comprising third and fourth arrays of light sources illuminating side edges of said lens.

8. An illuminator according to claims 2 further comprising a transparent cover disposed against said front face of said lens.

9. An illuminator according to claim 2, said light sources being light emitting diodes.

10. For a board displaying a Plurality of parallel strips of alpha-numeric/graphic information on a front face thereof, an illuminator comprising a lens having upper and lower edges parallel to said grooves and adapted to be disposed in front of the information, an array of light sources directly illuminating an edge of said lens, a plurality of parallel grooves positioned in a front face of said lens for orthogonal juxtaposition between the strips for dispersing light received from said array onto the strips of information and a plurality of masking strips disposed on a rear face of said cover, each masking strip being coincident with one of said grooves.

11. A lighted board comprising a backboard adapted to display a plurality of strips of alpha-numeric/graphic information on a front face thereof, a lens spaced in front of said front face of said backboard, an array of light sources directly illuminating an edge of said lens and a plurality of grooves arranged in a front face of said lens for dispersing light received from said array onto said strips of information.

12. An illuminator according to claim 11, said front face of said backboard having a plurality of spaced-apart channels for lateral slidable insertion and removal of said strips of information.

13. An illuminator according to claim 12, each of said channels having upper and lower flanges and a central rib along a length thereof for engaging front and rear faces of said strips of information, respectively.

14. An illuminator according to claim 11, said lens having upper and lower edges parallel to said grooves.

15. An illuminator according to claim 14, said array of light sources illuminating one of said parallel edges.

16. An illuminator according to claim 15 further comprising a second array of light sources illuminating another of said parallel edges.

17. An illuminator according to claim 16, said lens being rectangular.

18. An illuminator according to claim 17 further comprising third and fourth arrays of light sources illuminating side edges of said lens.

19. An illuminator according to claim 11 further comprising a transparent cover disposed against said front face of said lens.

20. An illuminator according to claim 19 further comprising a plurality of masking strips disposed on a rear face of said cover, each masking strip being coincident with one of said grooves.

21. An illuminator according to claim 11, said light sources being light emitting diodes.

22. A lighted board comprising a backboard having a front face with a plurality of spaced-apart channels adapted for lateral slidable insertion and removal of strips of alpha-numeric/graphic information therein, a lens having parallel upper and lower edges spaced in front of said front face of said backboard, an array of light sources directly illuminating one of said parallel edges of said lens, and a plurality of grooves arranged in a front face of said lens and parallel to said upper and lower edges thereof for dispersing light received from said array onto said strips of information.

23. An illuminator according to claim 22, each of said channels having upper and lower flanges and a central rib along a length thereof for engaging front and rear faces of said strips of information, respectively.

24. An illuminator according to claim 22 further comprising a second array of light sources illuminating another of said parallel edges.

25. An illuminator according to claim 24, said lens being rectangular.

26. An illuminator according to claim 25 further comprising third and fourth arrays of light sources illuminating side edges of said lens.

27. An illuminator according to claim 22 further comprising a transparent cover disposed against said front face of said lens.

28. An illuminator according to claim 27 further comprising a plurality of masking strips disposed on a rear face of said cover, each masking strip being coincident with one of said grooves.

* * * * *